United States Patent
Keenihan et al.

(10) Patent No.: US 8,361,602 B2
(45) Date of Patent: Jan. 29, 2013

(54) MULTI-LAYER LAMINATE STRUCTURE AND MANUFACTURING METHOD

(75) Inventors: James R. Keenihan, Midland, MI (US); Robert J. Cleereman, Midland, MI (US); Gerald Eurich, Merrill, MI (US); Andrew T. Graham, Midland, MI (US); Joe A. Langmaid, Caro, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/345,341

(22) Filed: Jan. 6, 2012

(65) Prior Publication Data

US 2012/0118361 A1    May 17, 2012

Related U.S. Application Data

(62) Division of application No. 12/855,148, filed on Aug. 12, 2010.

(60) Provisional application No. 61/233,527, filed on Aug. 13, 2009.

(51) Int. Cl.
*B32B 37/02* (2006.01)

(52) U.S. Cl. ............ 428/192; 428/195.1; 428/203; 428/210; 257/E25.009

(58) Field of Classification Search ............ 428/192, 428/195.1, 203, 210; 156/285; 257/E25.009
See application file for complete search history.

(56) References Cited

U.S. PATENT DOCUMENTS

| | | | |
|---|---|---|---|
| 5,197,243 A | 3/1993 | Mozawa et al. | |
| 5,578,142 A | 11/1996 | Hattori et al. | |
| 5,733,382 A | 3/1998 | Hanoka | |
| 6,320,116 B1 * | 11/2001 | Hanoka | 136/251 |
| 2006/0049169 A1 | 3/2006 | Li | |
| 2008/0041442 A1 * | 2/2008 | Hanoka | 136/251 |
| 2009/0000222 A1 | 1/2009 | Kalkanoglu et al. | |
| 2011/0308567 A1 * | 12/2011 | Chung | 136/244 |

FOREIGN PATENT DOCUMENTS

| | | |
|---|---|---|
| EP | 0 325 369 A2 | 7/1989 |
| EP | 0325369 A2 | 7/1989 |
| EP | 0850794 A1 | 7/1998 |
| EP | 1057606 A1 | 12/2000 |
| EP | 2 014 454 A1 | 1/2009 |
| EP | 2014454 A1 | 1/2009 |
| GB | 1 517 302 A | 7/1978 |
| GB | 1517302 A | 7/1978 |
| JP | 2002 111014 A | 4/2002 |
| JP | 2002111014 A | 4/2002 |
| WO | 2007062633 A2 | 6/2007 |
| WO | 2007149969 A2 | 12/2007 |
| WO | 2008025561 A1 | 3/2008 |

OTHER PUBLICATIONS

Co-pending PCT application Publication WO2009/42496 published Nov. 12, 2009.
Co-pending PCT application Publication WO2009/42507 published Nov. 12, 2009.
Co-pending PCT application Publication WO2009/42492 published Nov. 12, 2009.

(Continued)

*Primary Examiner* — Gerard Higgins
*Assistant Examiner* — Christopher Polley
(74) *Attorney, Agent, or Firm* — Dobrusin & Thennisch PC

(57) ABSTRACT

The present invention is premised upon a multi-layer laminate structure and method of manufacture, more particularly to a method of constructing the multi-layer laminate structure utilizing a laminate frame and at least one energy activated flowable polymer.

9 Claims, 5 Drawing Sheets

OTHER PUBLICATIONS

Co-pending PCT application Publication WO2009/42523 published Nov. 12, 2009.
Co-pending PCT application Publication WO2009/42522 published Nov. 12, 2009.
International Search Report for PCT/US2010/045284, dated Nov. 15, 2010.
Search Report and Written Opinion dated Nov. 15, 2010, International Application No. PCT/US2010/045284.

* cited by examiner

MULTI-LAYER LAMINATE STRUCTURE AND MANUFACTURING METHOD

CLAIM OF PRIORITY

This application is a divisional of copending application Ser. No. 12/855,148 filed on Aug. 12, 2010, which claims the benefit of the filing date of provisional application No. 61/233,527, filed Aug. 13, 2009, all of which are incorporated herein by reference.

This invention was made with U.S. Government support under contract DE-FC36-07G017054 awarded by the Department of Energy. The U.S. Government has certain rights in this invention.

FIELD OF THE INVENTION

The present invention relates to a multi-layer laminate structure and method of manufacture, more particularly to a method of constructing the multi-layer laminate structure utilizing a laminate frame and at least one energy activated flowable polymer.

BACKGROUND

Efforts to improve the manufacturing of multi-layer laminate structures, is an on-going endeavor. It is believed that one problem associated with the manufacture of multi-layered laminate structures is the ability to manufacture a part with consistent dimensional/geometric characteristics (e.g. length, width, thickness, profiles). Another problem may be manufacturing inefficiencies, such as high scrap rates, slow cycle times, and/or the need for secondary operations (e.g. secondary trimming or milling operations). One potential reason for such issues may be due to the dimensional/geometric tolerances of each individual layer that make up the multi-layer laminate structures. Another potential reason for such issues may be due to the disparity in the material properties of the layers (e.g. thermal expansion/contraction) and the effect these properties have during the lamination process. Problems with the placing, holding or nesting of the individual layers also may be an issue. Yet another further problem may be introduced due to inconsistencies in the lamination process itself (e.g. energy application, vacuum application, etc.).

Among the literature that may pertain to this technology include the following patent documents: U.S. Pat. No. 5,197,243A; EP850794B1; WO2007149969A2; U.S. Pat. No. 5,733,382A; EP958616A2; U.S. Pat. No. 5,578,142A; WO2007062633A2; EP105760682; WO2008025561A1; EP85711681; PCT/US09/42496; PCT/US09/42507; PCT/US09/42492; PCT/US09/42523; and PCT/US09/42522, all incorporated herein by reference for all purposes.

SUMMARY OF THE INVENTION

The present invention is directed to a multi-layer laminate structure and method of manufacture, more particularly to a method of constructing the multi-layer laminate structure utilizing a laminate frame and at least one energy activated flowable polymer, and in one preferred embodiment to a multi-layer laminate structure that serves as an intermediate assembly of a photovoltaic device. The invention addressing one or more of the issues/problems discussed above.

Accordingly, pursuant to one aspect of the present invention, there is contemplated a method of constructing a multi-layer laminate structure, including at least some of the steps of: a. providing a lamination frame, wherein the frame includes a first frame surface, a second frame surface and an external side frame surface interconnecting the first and second surfaces defining a frame thickness, further wherein the frame includes an internal side frame surface that projects towards the second frame surface from the first frame surface at least through a portion of the frame thickness defining a first frame pocket and a first frame pocket side wall profile; b, providing a first layer including a first layer top surface portion, first layer bottom surface portion, and a first layer side surface portion interconnected between the top and bottom portions, wherein the first layer has a first layer length and first layer width adapted to fit within the first frame pocket; c. providing a second layer including a second layer top surface portion, second layer bottom surface portion, and a second layer side surface portion interconnected between the top and bottom portions, wherein the second layer includes an energy activated flowable polymer and further wherein the second layer has a second layer length, a second layer width, and a second layer thickness such that it can at least partially flow into and fill at least a portion of a first gap between the internal side frame surface and the first layer side surface portion; d. providing an energy source; e. introducing the first layer to the first pocket; f. placing the second layer bottom surface portion at least partially in communication with the first layer top surface portion creating a multi-layer stack; g. applying the energy source to the lamination frame, the multi-layer stack, or both, causing the energy activated flowable polymer to bond to the first layer and at least partially flow into the first gap between the first layer side surface portion and the internal side frame surface creating a bead with a bead width and a bead depth, the bead depth defined by a depth of the internal side frame surface; h. allowing the energy activated flowable polymer to at least partially solidify, forming the multi-layer laminate structure; and i. separating the multi-layer laminate structure from the lamination frame.

The invention may be further characterized by one or any combination of the features described herein, such as: The method as set forth above further including one or more of the following steps: (1) providing a third layer including a third layer top surface portion, third layer bottom surface portion, and a third layer side surface portion interposed between the top and bottom portions; and placing the third layer in at least partial communication with the second layer top surface portion or with the second layer bottom surface portion; wherein these steps occur before step g above; (2) the third layer has a third layer length and third layer width less than that of the first pocket; causing the energy activated flowable polymer to bond to the third layer and at least partially flow into a third gap between the third layer side surface portion and the internal side frame surface creating the bead that is coextensive with that of step g above; (3) the third layer has a third layer length and third layer width greater than that of the first pocket; (4) the first frame pocket side wall profile tapers inward by at least a 1.5° angle over at least a portion of the first frame pocket side wall as it progresses towards the second frame surface; (5) a first pocket length and a first pocket width of the first frame pocket is no greater than 10.0 mm larger than the first layer length, the first layer width, or both; the second layer length, the second layer width, or both is no greater than 10.0 mm larger than that of the first layer; (6) providing a second frame pocket including a second frame pocket side wall profile; (7) the second frame pocket includes at least one insertable frame section; (8) the first layer comprises a glass plate; (9) the third layer comprises a photovoltaic cell assembly; (10) the lamination frame includes at least one keeper pocket adapted to mate with at least a portion of the photovoltaic cell assembly; (11) the internal side frame surface that projects towards the second frame surface from the first frame surface does so through the entire frame thickness; (12) providing a plurality of additional layers forming the multi-layer stack and placing the plurality of additional layers in at least partial communication with an adjacent layer, wherein these steps occur before step g above; (13) providing at least one additional frame pocket including a frame pocket side wall profile; (14) each frame pocket includes at least one layer of the multilayer stack; providing a vacuum source and placing the lamination frame along with the multi-layer stack under a vacuum; (15) the multilayer stack includes at least a glass layer, a photovoltaic cell assembly layer, or a back sheet layer; (16) the second layer has a second layer length, a second layer width, and a second layer thickness such that it can flow into and fill the first gap between the internal side frame surface and the first layer side surface portion.

Accordingly, pursuant to another aspect of the present invention, there is contemplated a laminate frame including a first frame surface; a second frame surface; and an external side frame surface interconnecting the first and second surfaces defining a frame thickness; the frame includes an internal side frame surface that projects towards the second frame surface from the first frame surface at least through a portion of the frame thickness defining a first frame pocket and a first frame pocket side wall profile.

The invention may be further characterized by one or any combination of the features described herein, such as a frame section that defines a second frame pocket and a second frame pocket side wall profile; the first frame pocket side wall profile tapers inwards by at least a 5° angle over at least a portion of the first frame pocket side wall as it projects towards the second frame surface; the laminate frame includes a keeper pocket; and inserted in the first pocket a first layer and a second layer of an energy activated flowable polymer and optionally a photovoltaic cell assembly interposed between the first and second layers.

Accordingly, pursuant to yet another aspect of the present invention, there is contemplated a multi-layer laminate structure including: at least two adjoining layers, the layers including: a first layer including a first top surface portion, a first bottom surface portion, and a first side surface portion interconnected between the first top and the first bottom portions, a second layer including a second top surface portion, a second bottom surface portion, and a second side surface portion interconnected between the second top and the second bottom portions, wherein the second layer comprises an energy activated flowable polymer; wherein the second layer at least partially is bonded to a portion of the side surface portion of the first layer creating a bead of the energy activated flowable polymer about at least a portion of the periphery of the first layer, further wherein the bead has an untrimmed outer surface.

The invention may be further characterized by one or any combination of the features described herein, such as the first layer comprises a glass plate; the structure includes a third layer and a fourth layer; the second, third, or fourth layer comprises a photovoltaic cell assembly; the second, third, or fourth layer comprises a back sheet; at least a portion of the back sheet includes a second energy activated flowable polymer; the photovoltaic cell assembly comprises at least a cell portion and the cell portion is at least 5 mm from an exterior edge of the multi-layer laminate structure; the structure includes five or more layers; and a structure including a plurality of laminate frames enabling multiple laminates to be made simultaneously.

It should be appreciated that the above referenced aspects and examples are non-limiting, as others exist within the present invention, as shown and described herein.

DETAILED DESCRIPTION OF THE PREFERRED EMBODIMENT

Figure 1:
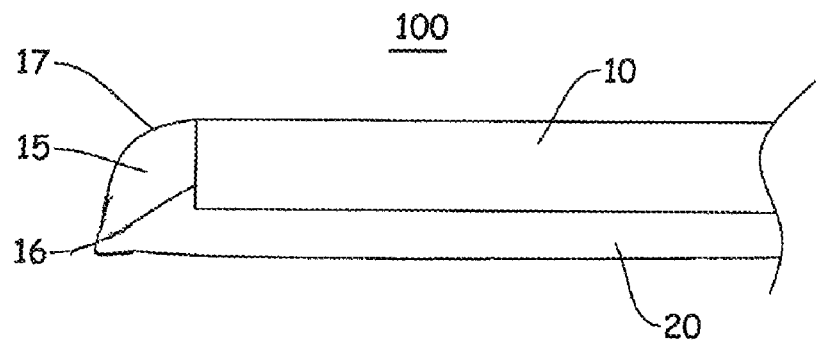
FIG. 1 is a partial side and or sectional view of one possible multi-layer laminate structure according to the teachings of the present invention.

The present invention is directed to a multi-layer laminate structure and method of manufacture, more particularly to a method of constructing the multi-layer laminate structure utilizing a laminate frame and at least one energy activated flowable polymer. In one preferred embodiment the multi-layer laminate structure is an intermediate assembly of a photovoltaic device. Examples of the various layer combinations can be seen in FIGS. 1-3 and various configurations of the laminate frame can be seen in FIGS. 5-10 (FIG. 4 showing a photovoltaic cell assembly). Layers It is contemplated that the multi-layer laminate structure 100 may include a plurality of individual layers (e.g. first layer, second layer, third layer, or more) which are at least partially bonded together to form the multi-layer laminate structure 100. It is also contemplated that in the assembled multi-layer laminate structure 100, that any given layer may at least partially interact/interface with more than just its adjacent layer (e.g. first layer may interact/interface at least partially with the third layer).

Each individual layer may be defined as having a height, length and width, and thus a volume. Each layer may also have a profile that is consistent along its height, length or width or may be variable therein. Each layer may have top, bottom, and interposed side surfaces. Each individual layer may be monolithic in nature or may itself be a multi-layer construction or an assembly of constituent components. In a preferred embodiment, at least some of the layers have a thickness that may range from as small as about 0.001 mm to about 2.0 mm or more.

Various layer construction/compositions embodiments are discussed below. It should be appreciated that any layer of the multi-layer laminate structure 100 may contain any or none of the materials or assemblies. In other words, any particular layer embodiment may be part of any of the layers of the multi-layer laminate structure 100.

In a preferred embodiment, one or more of the layers may function as an environmental shield ("shield layer") for the multi-layer laminate structure 100 generally, and more particularly as an environmental shield for the successive layers. This layer is preferably constructed of a transparent or translucent material that allows light energy to pass through to at least one underlying layer. This material may be flexible (e.g. a thin polymeric film, a multi-layer film, glass, or glass composite) or be rigid (e.g. a thick glass or Plexiglas™ such as polycarbonate). The material may also be characterized by being resistant to moisture/particle penetration or build up. The first layer may also function to filter certain wavelengths of light such that preferred wavelengths may readily reach the opposite side of that layer, e.g. photovoltaic cells below the shield layer. In a preferred embodiment, the first layer material will also range in thickness from about 0.05 mm to 10.0 mm, more preferably from about 0.1 mm to 4.0 mm, and most preferably from 0.2 mm to 0.8 mm. Other physical characteristics, at least in the case of a film, may include: a tensile strength of greater than 20 MPa (as measured by JIS K7127: JSA JIS K 7127 Testing Method for Tensile Properties of Plastic Films and Sheets published in 1989); tensile elongation of 1% or greater (as measured by JIS K7127); and water absorption (23° C., 24 hours) of 0.05% or less (as measured per ASTM D570-98(2005)).

In a preferred embodiment, one or more of the layers may serve as a bonding mechanism ("bonding layer"), helping hold some or all of any adjacent layers together. In some case (although not always), it should also allow the transmission of a desirous amount and type of light energy to reach adjacent layers. The bonding layer may also function to compensate for irregularities in geometry of the adjoining layers or translated though those layers (e.g. thickness changes). It also may serve to allow flexure and movement between layers due to temperature change and physical movement and bending. In a preferred embodiment, the bonding layer may consist essentially of an adhesive film or mesh, preferably an olefin (especially functionalized olefins such as silane grafted olefins), EVA (ethylene-vinyl-acetate), silicone, PVB (poly-vinyl-butyral) or similar material. The preferred thickness of this layer range from about 0.1 mm to 1.0 mm, more preferably from about 0.2 mm to 0.8 mm, and most preferably from about 0.25 mm to 0.5 mm.

In a preferred embodiment, one or more of the layers may be constructed of any number of known photovoltaic cells or cell assemblies ("PV layer") commercially available or may be selected from some future developed photovoltaic cells. These cells function to convert light energy into electrical energy. The photoactive portion of the photovoltaic cell is the material which converts light energy to electrical energy. Any material known to provide that function may be used including crystalline silicon, amorphous silicon, CdTe, GaAs, dye-sensitized solar cells (so-called Gratezel cells), organic/polymer solar cells, or any other material that converts sunlight into electricity via the photoelectric effect. However, the photoactive layer is preferably a layer of IB-IIIA-chalcogenide, such as IB-IIIA-selenides, IB-IIIA-sulfides, or IB-IIIA-selenide sulfides. More specific examples include copper indium selenides, copper indium gallium selenides, copper gallium selenides, copper indium sulfides, copper indium gallium sulfides, copper gallium selenides, copper indium sulfide selenides, copper gallium sulfide selenides, and copper indium gallium sulfide selenides (all of which are referred to herein as CIGSS). These can also be represented by the formula CuIn(1-x)GaxSe(2-y)Sy where x is 0 to 1 and y is 0 to 2. The copper indium selenides and copper indium gallium selenides are preferred. Additional electroactive layers such as one or more of emitter (buffer) layers, conductive layers (e.g. transparent conductive layers) and the like as is known in the art to be useful in CIGSS based cells are also contemplated herein. These cells may be flexible or rigid and come in a variety of shapes and sizes, but generally are fragile and subject to environmental degradation. In a preferred embodiment, the photovoltaic cell assembly is a cell that can bend without substantial cracking and/or without significant loss of functionality. Exemplary photovoltaic cells are taught and described in a number of patents and publications, including U.S. Pat. No. 3,767,471, U.S. Pat. No. 4,465,575, US20050011550 A1, EP841706 A2, US20070256734 A1, EP1032051A2, JP2216874, JP2143468, and JP10189924A, incorporated hereto by reference for all purposes.

In a preferred embodiment, one or more of the layers may also serve as an environmental protection layer ("back sheet layer"), for example to keep out moisture and/or particulate matter from the layers above (or below if there are additional layers). It is preferably constructed of a flexible material (e.g. a thin polymeric film, a metal foil, a multi-layer film, or a rubber sheet). In a preferred embodiment, the back sheet material may be moisture impermeable and also range in thickness from about 0.05 mm to 10.0 mm, more preferably from about 0.1 mm to 4.0 mm, and most preferably from about 0.2 mm to 0.8 mm. Other physical characteristics may include: elongation at break of about 20% or greater (as measured by ASTM D882-09); tensile strength or about 25 MPa or greater (as measured by ASTM D882-09); and tear strength of about 70 kN/m or greater (as measured with the Graves Method). Examples of preferred materials include glass plate, PET, aluminum foil, Tedlar® (a trademark of DuPont) or a combination thereof.

In a preferred embodiment, one or more of the layers may act as an additional barrier layer ("supplemental barrier layer"), protecting the adjoining layers above from environmental conditions and from physical damage that may be caused by any features of the structure on which the multi-layer laminate structure 100 is subjected to (e.g. for example, irregularities in a roof deck, protruding objects or the like). It is also contemplated that a supplemental barrier layer could provide other functions, such as thermal barriers, thermal conductors, adhesive function, etc. It is contemplated that this is an optional layer and may not be required. The supplemental barrier sheet may be a single material or a combination of several materials, for example, it may include a scrim or reinforcing material. In a preferred embodiment, the supplemental barrier sheet material may be at least partially moisture impermeable and also range in thickness from about 0.25 mm to 10.0 mm, more preferably from about 0.5 mm to 2.0 mm, and most preferably from 0.8 mm to 1.2 mm. It is preferred that this layer exhibit elongation at break of about 20% or greater (as measured by ASTM D882-09); tensile strength or about 10 MPa or greater (as measured by ASTM D882-09); and tear strength of about 35 kN/m or greater (as measured with the Graves Method). Examples of preferred materials of which the barrier layer could be comprised include thermoplastic polyolefin ("TPO"), thermoplastic elastomer, olefin block copolymers ("OBC"), natural rubbers, synthetic rubbers, polyvinyl chloride, and other elastomeric and plastomeric materials, Alternately the protective layer could be comprised of more rigid materials so as to provide additional structural and environmental protection. Additional rigidity may also be desirable so as to improve the coefficient of thermal expansion of the multi-layer laminate structure 100 and maintain the desired dimensions during temperature fluctuations. Examples of protective layer materials for structural properties include polymeric materials such polyolefins, polyester amides, polysulfone, acetel, acrylic, polyvinyl chloride, nylon, polycarbonate, phenolic, polyetheretherketone, polyethylene terephthalate, epoxies, including glass and mineral filled composites or any combination thereof.

EXAMPLES

In one illustrative example, seen in FIG. 1, the multi-laminate structure 100 consists essentially of two layers, a first layer 10 and a second layer 20. In this example, the first layer ("shield layer") 10 may comprise a glass material (e.g. sheet glass) and the second layer 20 ("bonding layer") an energy activated flowable polymer. In this example, the application of the method described below creates a multi-laminate structure 100 with the two layers at least partially bonded to one another and a bead structure 15 created by the flow of the energy activated flowable polymer at least partially disposed on the side surface 16 of the first layer 10. In a preferred embodiment, the bead structure 15 does not require any post processing (with the possible exception of removal of excess polymer which is commonly referred to as flash, that extends from the bead outer surface 17 with a thickness of no more than about 0.2 mm to about 2.0, more preferably less than about 1.0 mm, most preferably less than about 0.5 mm) and has an untrimmed outer surface 17.

Figure 2:
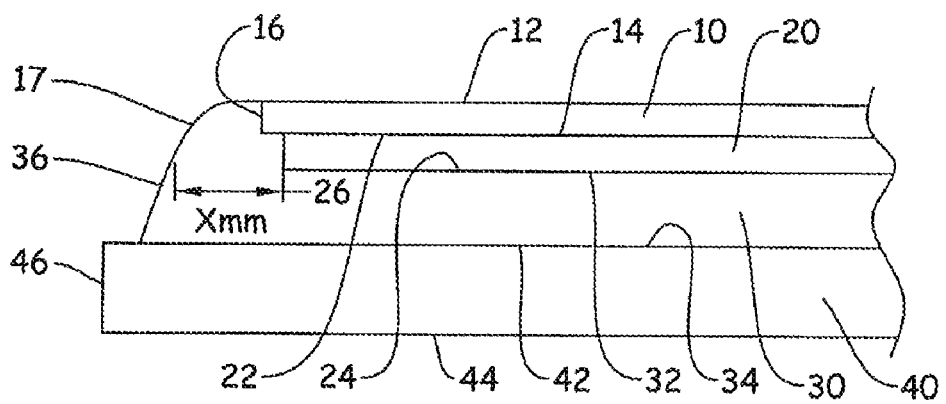
FIG. 2 is a partial side and or sectional view of another possible multi-layer laminate structure according to the teachings of the present invention.

In a second illustrative example, seen in FIG. 2, the multi-layer laminate structure 100 includes at least four adjoining layers. The layers including a first layer 10 including a first top surface portion 12, a first bottom surface portion 14, and a first side surface portion 16 interconnected between the first top and the first bottom portions. A second layer 20 including a second top surface portion 22, a second bottom surface portion 24, and a second side surface portion 26 interconnected between the second top and the second bottom portions. A third layer 30 including a third top surface portion 32, a third bottom surface portion 34, and a third side surface portion 36 interconnected between the third top and the third bottom portions, wherein the third layer 30 comprises an energy activated flowable polymer ("bonding layer"). A fourth layer 40 including a fourth top surface portion 42, a fourth bottom surface portion 44, and a fourth side surface portion 46 interconnected between the fourth top and the fourth bottom portions. It is contemplated that the third layer 30 creates at least a partial bond between the adjoining layers, further contemplated that the third layer 30 at least partially is bonded to a portion of the side surface portion 16 of the first layer 10 creating a bead 15 of the energy activated flowable polymer about at least a portion of the periphery of the upper layer and the bead 15 has an untrimmed outer surface 17. As shown, the fourth layer 40 extends past the first through third layers, although this is not necessary.

Optionally, in the second example, the following is contemplated. The first layer 10 includes a glass plate ("shield layer"). The second 20, third 30, or fourth layer 40 includes a photovoltaic cell assembly ("PV layer") and/or a back sheet ("back sheet layer"). The back sheet may also include an integral second energy activated flowable polymer as part of its composition. The photovoltaic cell assembly 70, as seen in FIG. 4, includes at least a cell portion 72 and the cell portion is at least a distance of about Xmm from an exterior edge of the multi-layer laminate structure 100 or outer surface 17 of the bead 15. It is contemplated that this could be very near the edge (<about 5 mm) (<"less than"; >"greater than") in applications where environmental penetration isn't as much of a concern. In one example it is >about 5 mm, more preferably >about 10, more preferably >about 15 mm, most preferably >about 20 mm. As number increases it is believed that the area efficiency decreases, suggesting <about 20 mm, but >about 5 mm is preferable.

Figure 3:
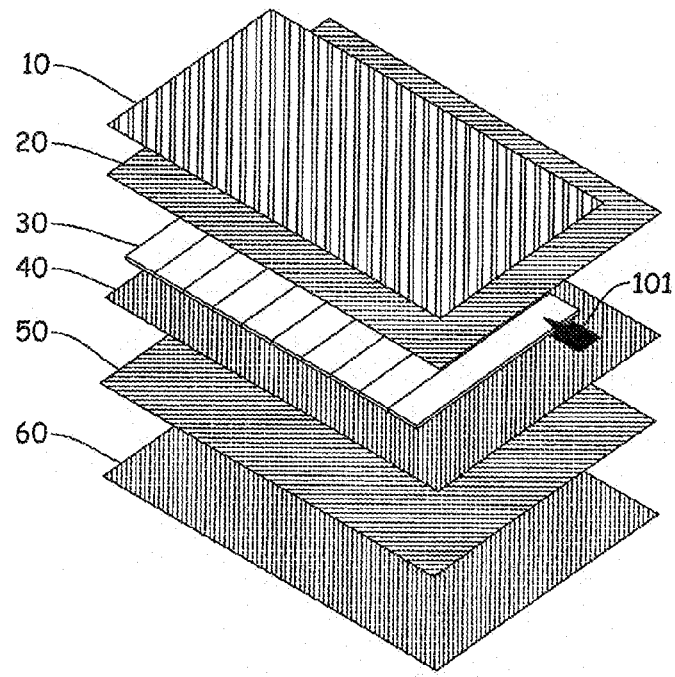
FIG. 3 is an exploded view of another possible multi-layer laminate structure according to the teachings of the present invention.
Figure 4:
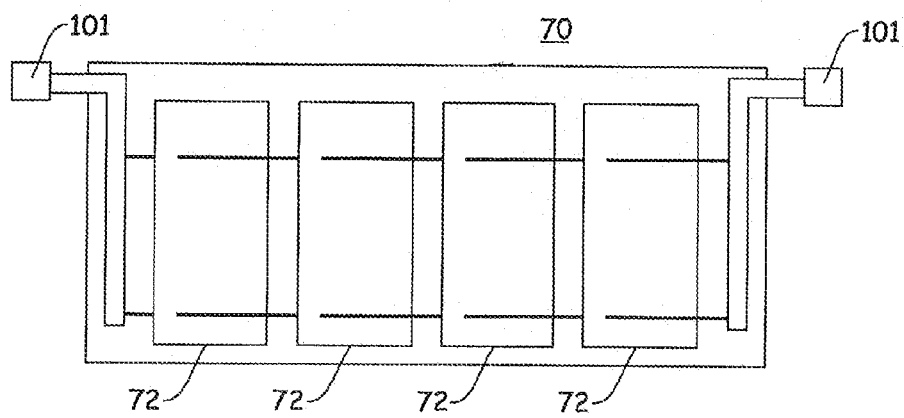
FIG. 4 is a plan view of an exemplary photovoltaic cell assembly.

In a third illustrative example, seen in FIG. 3, the multi-layer laminate structure 100 includes at least six adjoining layers. The layers including a first layer 10 ("shield layer") formed primarily of a glass plate, a second layer 20 ("bonding layer") formed primarily of an energy activated flowable polymer, a third layer 30 ("PV layer") formed primarily of a photovoltaic cell assembly, a fourth layer 40 ("bonding layer") formed primarily of an energy activated flowable polymer, a fifth layer 50 ("back sheet layer") formed primarily of a back sheet as described above, and a sixth layer 60 ("supplemental barrier layer") formed primarily of a supplemental barrier sheet as described above. The bead structure (not shown) is formed by at least one of the energy activated flowable polymer layers, after forming in the lamination frame 1000. As shown, the sixth layer 60 extends past the first through third layers, although this is not necessary.

As with all the above examples that include a PV layer, it is believed that it is advantageous to locate the cell portion at least the distance Xmm or more from the exterior edge 17. The advantage may be in the prevention of moisture migration from reaching the cell portion over time (e.g. the 20 to 25 useful life span of the end product). In a preferred embodiment, the distance Xmm is about 5.0 mm, more preferably about 10.0 mm, and most preferably about 15.0 mm.

Laminate Frame

It is contemplated that a unique laminate frame 1000 may be utilized in the manufacture of the multi-layer laminate structure 100. The frame 1000 may generally function to provide holding, locating, and dimensional control during the manufacturing of the multi-layer laminate structure 100 and dimensional consistency of the final part. Applicants have discovered that lack of dimensional consistency from part to part makes subsequent processing of the laminate structures impractical due to scrap and breakage particularly when the laminate is processed particularly in tooled equipment such as injection molds or the like. Use of the frame in lamination with a bead forming the exterior dimension leads to dimensional consistency that enables subsequent processing (e.g. injection molding) or assembly (e.g. inserting into or onto a secondary component) efficiently and without undue waste. The unique laminate frame 1000 also may provide for the net or near net shape of the exterior profile of the multi-layer laminate structure 100.

Figure 9:
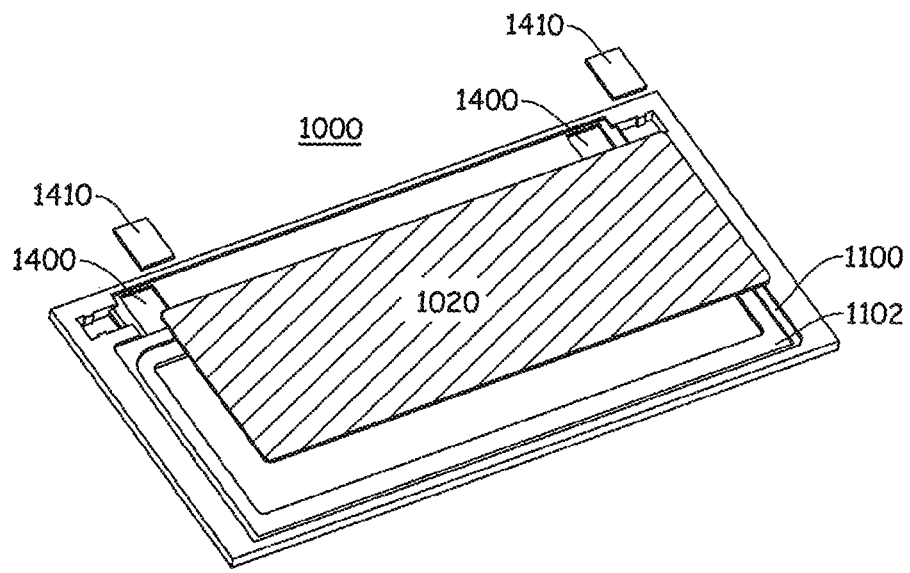
FIG. 9 is a perspective view of another possible laminate frame according to the teachings of the present invention.

Generally, the laminate frame 1000 may include a first frame surface, a second frame surface and an external side frame surface interconnecting the first and second surfaces thus defining a frame thickness. The frame may include an internal side frame surface that projects towards the second frame surface from the first frame surface (at least through a portion of the frame thickness or all the frame thickness in places) defining a first frame pocket and a first frame pocket side wall profile. The frame pocket may be of any of a variety of geometric shapes, for example, the pocket may have 3 (triangular), 4 (rectangular) or more sides or it may consist of a combination of straight and curved portions. The frame may also include a plurality of additional frame pockets (e.g. second frame pocket 1102 (e.g. as illustrated in FIG. 9), third frame pocket, a keeper pocket, etc . . . ), generally outside the area of the first frame pocket (although it may be at least partially coextensive) and including side wall profiles and internal frame surfaces. It is contemplated that the frame does not have to be 4 sided, but can have up to 6 primary surfaces (e.g. as in a cube or full cavity and core). It is further contemplated that the frame surfaces may or may not be planer so as to accept flat or curved layers as required to produce desired contours.

Figure 5:
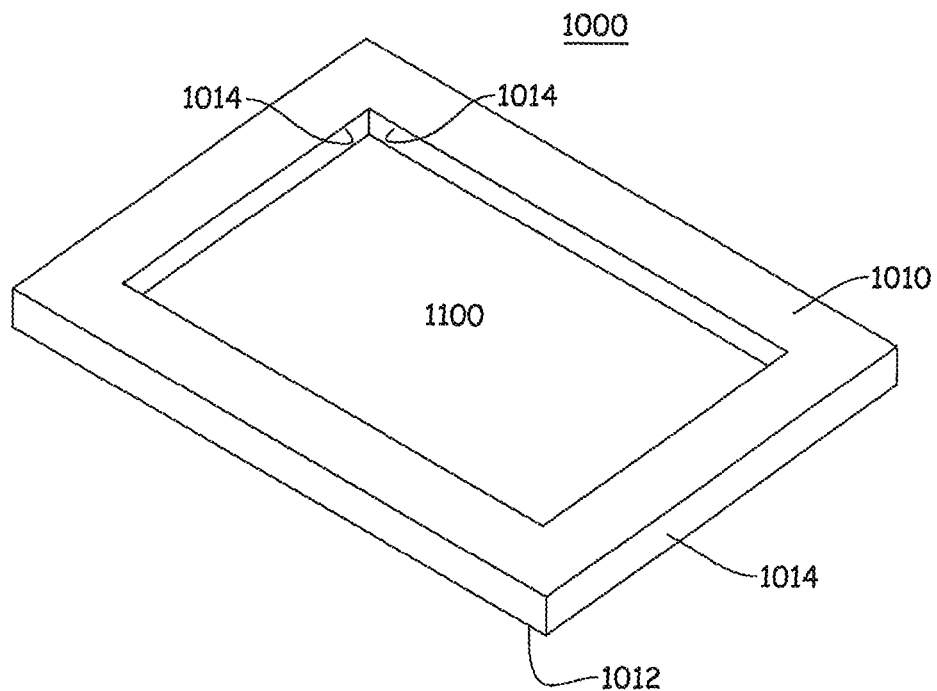
FIG. 5 is a perspective view of one possible laminate frame according to the teachings of the present invention.

The lamination frame 1000 may comprise multiple sets of pockets (where, in the meaning of set of pockets. FIGS. 5 and 9, individually depict two variations on a set of pockets useful in lamination frames.) It is anticipated that a frame with multiple sets of pockets may be particularly useful in manufacturing laminations at an increased manufacturing rate in an automated or semi-automated process (i.e., with increased use of robotics).

Figure 7:
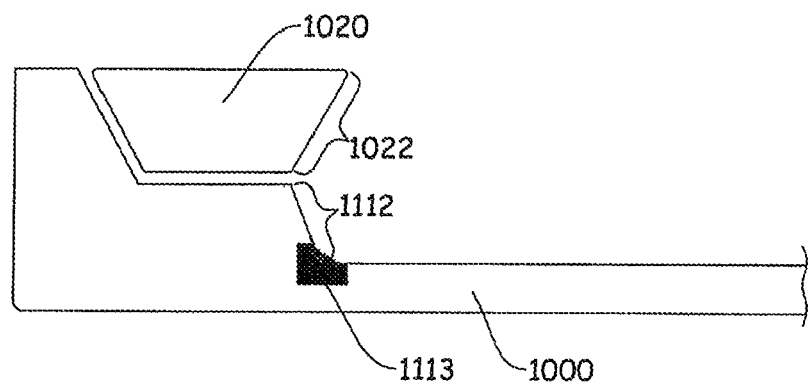
FIG. 7 is a partial sectional view of another possible laminate frame according to the teachings of the present invention.

The lamination frame 1000 may be made of any number of materials or combination of materials. Preferably, the frame may be constructed to be highly thermally conductive (e.g. aluminum, steel) and preferably has a low thermal capacity. It is also preferably dimensionally stable with the changes in temperature and (CLTE) and maintains shape (strength and modulus.) It is contemplated that the frame 1000 may be constructed with a non-stick surface (coating or as substrate) so it can be removed from the completed laminate 100 after the energy activated flowable polymer is cured or cooled to the proper modulus. The frame 1000 may be rigid so the multi-layered laminate structure 100 can be forced out without any damage to the frame 1000. Alternately it may be more flexible than the laminate 100, so as to be pealed from the laminate 100. It is also contemplated that the frame may be locally more flexible, for example in local area 1113 of taper 1112 and/or in the bottom surface of the frame (e.g. as shown in FIG. 7).

It is contemplated that the side wall profile of the any or all of the pockets may be of any shape, but is preferably tapered inwards by at least about a 1.5° angle, more preferably by at least about a 3.5° angle, and most preferably by at least a 5.0° angle. This taper may be present so that finished multi-layered laminate structure 100 can be removed with relative ease (e.g. no die-lock). It is further contemplated that the issue of die lock may be at least partially overcome by the use of insertable frame pieces, flexible frame materials, or any combination thereof. It may also be present to address a previously unrecognized problem is that one cannot be certain that all the layers (e.g. the glass layer) will be of uniform size or positioned properly inside the lamination frame. The tapered edge may insure that the energy activated flowable polymer has a space in which to flow and seal edges or provide for bonding despite being potentially located tightly to the frame. Preferably, the taper is present in at least about the first 10% of the side wall profile (as measured peripherally and vertically), more preferably in at least about the first 20%, and most preferably in at least about the first 50%. It is contemplated that the taper may be present everywhere in the profile or not at all in some pockets.

In one preferred embodiment, the inventive product is an assembly including the laminate frame 1000 as at least partially described herein and the multi-layer laminate structure 100 as described above.

Insertable Frame Pieces

It is contemplated that the lamination frame 1000 may also include one or more insertable frame pieces 1020 (disposed separate from or coextensive with any of the pockets). These insertable frame pieces 1020 may function to at least locally alter a profile of the bead 15 and/or may function as an ejection aid (e.g. ejection aid as illustrated in FIG. 9). These pieces are preferably removable from the rest of the lamination frame and may allow for bead profiles that otherwise may create what is commonly known as a "die-lock" condition once the bead has formed. The laminate frame may be designed such that it has insertable features or upper and lower sections so as to form geometry on both sides of the laminate and still be removed from the laminate frame after processing. Another possible insertable piece may be a close-out frame plate 1030. In the case where the frame 1000 and multi-layer stack are placed under a vacuum, the plate 1030 may help distribute the vacuum load such that the laminate 100 is of a more uniform thickness. This may be especially important where one layer is designed to be of a different size to perform a specific function, for example, in a PV device the PV layer is not the same size as the laminate or where multiple layers overlap and the encapsulant needs to make the adjustment for uniformity of thickness.

Keeper Pocket

Figure 10:
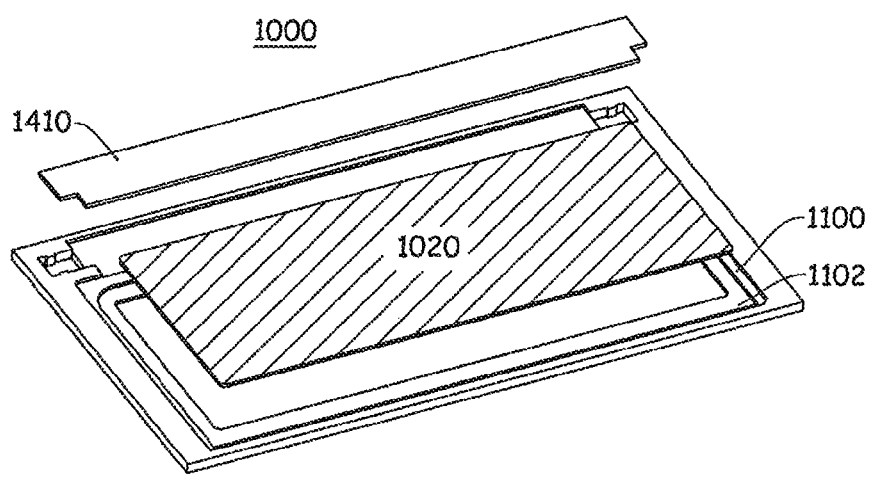
FIG. 10 is a perspective view of another possible laminate frame according to the teachings of the present invention.

It is contemplated that the frame 1000 may also include at least one keeper pocket 1400. The keeper pocket 1400 functions to allow the placement of additional components to the multilayer stack. The keeper pocket may also include a keeper cover piece 1410 which is at least partially nested over any additional components that are placed in the keeper pocket. The keeper pocket 1400 and keeper cover piece 1410 may aid in controlling the flow of the energy activated flowable polymer in the area of the additional components. In one preferred embodiment, as seen in FIG. 9, the frame 1000 includes two keeper pockets and keeper covers on opposing sides of the frame 1000. These pockets adapted to hold a connector piece 101 (for example as seen in FIGS. 3 and 4) (for example, the connector as described in Patent Application PCT/US09/42492, herby incorporated by reference). It is contemplated that the keeper cover piece 1410 can be a set of individual pieces that cover the keeper pockets 1400 (e.g. as shown in FIG. 9) or may be a single piece that is connected between the pockets 1400 (e.g. as shown in FIG. 10)

EXAMPLES

Figure 6:
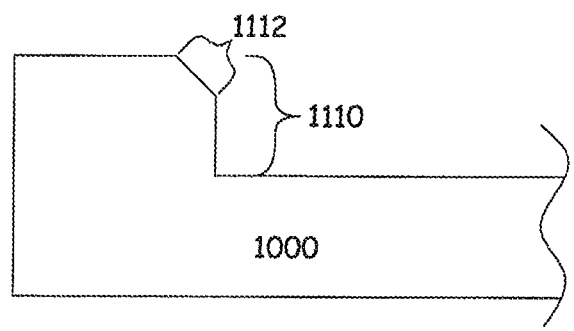
FIG. 6 is a partial sectional view of the frame of FIG. 5.

In one illustrative example, seen in FIGS. 5 and 6, the lamination frame 1000 includes a first frame surface 1010, a second frame surface 1012 and an external side frame surface 1014 interconnecting the first and second surfaces thus defining a frame thickness. The frame 1000 may include an internal side frame surface 1014 that projects towards the second frame surface 1012 from the first frame surface 1010 (at least through a portion of the frame thickness or all the frame thickness in places) defining a first frame pocket 1100 and a first frame pocket side wall profile 1110. The first frame pocket side wall profile 1110 includes a taper 1112 of about 1.5° in the first 10% of the profile 1110 as measured vertically, more preferably more than 50% or more.

Figure 8:
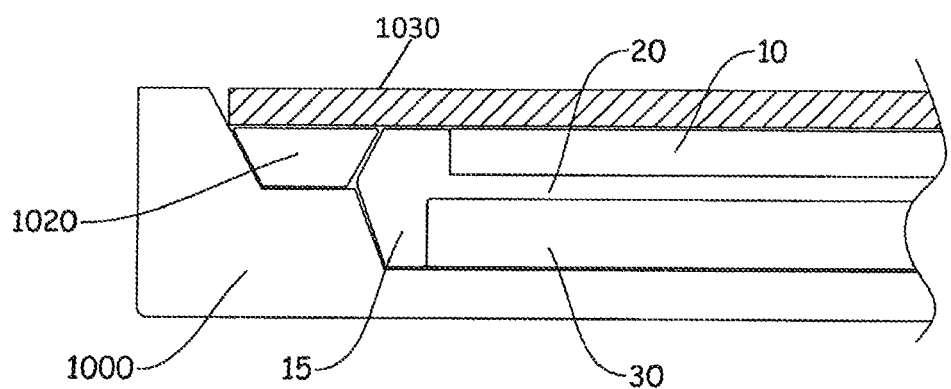
FIG. 8 is a partial sectional view of another possible laminate frame according to the teachings of the present invention.

In a second illustrative example, seen in FIGS. 7 and 8, the lamination frame 1000 includes an insertable frame piece 1020. In this example, the insertable frame piece 1020 includes an insert taper 1022 that is opposite to the taper 1112 of the first frame pocket 1110. In FIG. 8, an optional close-out frame plate 1030 is seen. Also seen is an exemplary laminate structure 100 with three layers 10, 20, and 30 with a bead structure 15.

In a third illustrative example, seen in FIG. 9 as a perspective exploded view, the lamination frame 1000 includes an insertable frame piece 1020, two keeper pockets 1400 and two keeper cover pieces 1410.

Manufacturing Steps

It is contemplated that the multi-layer laminate structure 100 (as described above) may be manufactured with the lamination frame (also as described above) with a method further described below. It is contemplated that the various layers in the multi-layer structure 100 may be loaded into the frame in any number of orders (e.g. pre-stacking some or all the layers or stacking only in the frame) and orientations (e.g. frame up, frame down, or at any angle in-between). It is contemplated that the frame may be used in a batch process or part of a continuous manufacturing process. For example, in a batch process, a number of frames 1000 are loaded with the layers and then subjected to energy source and/or vacuum as a group. For Example, in a continuous process, the frames 1000 could be on a conveyor system in a series and the loading, unloading and intermediate processing takes place in a continuous manner.

The method may include a number of steps, these steps including: a. providing a lamination frame, wherein the frame includes a first frame surface, a second frame surface and an external side frame surface interconnecting the first and second surfaces defining a frame thickness, further wherein the frame includes an internal side frame surface that projects towards the second frame surface from the first frame surface at least through a portion of the frame thickness defining a first frame pocket and a first frame pocket side wall profile; b. providing a first layer 10 including a first layer top surface portion, first layer bottom surface portion, and a first layer side surface portion interconnected between the top and bottom portions, wherein the first layer 10 has a first layer length and first layer width adapted to fit within the first frame pocket; c. providing a second layer 20 including a second layer top surface portion, second layer bottom surface portion, and a second layer side surface portion interconnected between the top and bottom portions, wherein the second layer 20 includes an energy activated flowable polymer and further wherein the second layer 20 has a second layer length, a second layer width, and a second layer thickness such that it can at least partially flow into and fill at least a portion of a first gap between the internal side frame surface and the first layer side surface portion; d. providing an energy source; e. introducing the first layer to the first pocket; f. placing the second layer bottom surface portion at least partially in communication with the first layer top surface portion creating a multi-layer stack; g. applying the energy source to the lamination frame, the multi-layer stack, or both, causing the energy activated flowable polymer to bond to the first layer 10 and at least partially flow into the first gap between the first layer side surface portion and the internal side frame surface creating a bead with a bead width and a bead depth, the bead depth defined by a depth of the internal side frame surface; h. allowing the energy activated flowable polymer to at least partially solidify, forming the multi-layer laminate structure 100; and i. separating the multi-layer laminate structure 100 from the lamination frame.

Energy Source

It is contemplated that the "energy source" may be provided by any number of methods such as an oven or a system of heating elements. For example, energy may be provided to the frame and/or layers via infrared, conductive, convective, microwave, or even chemical means, thus activating the energy activated flowable polymer.

Vacuum Source

In a preferred embodiment, once the layers are disposed in the frame, the frame is placed in a press that is capable of placing the frame/layers under a vacuum it is believed that this can aid in directing the flow of the energy activated flowable polymer and the creation of the bead. The vacuum may function to remove gasses, both those present from air and those created in the cross-linking of polymers, such as EVA. The vacuum function for removal of gasses may be further aided by incorporating venting or flow channels in the frame through clearances between layers and frame pieces or reliefs or projections in the frame. This vacuum may also be used to induce a uniform surface pressure on the laminate through the use of a flexible membrane or bladder. This membrane may also be positively pressurized, so as to increase the compression of the laminate assembly further than that of the vacuum. For example, one such vacuum press is described in U.S. Pat. No. 5,772,950, hereby incorporated by reference.

Optionally, the steps may include any combination of: providing a third layer 30 including a third layer top surface portion, third layer bottom surface portion, and a third layer side surface portion interposed between the top and bottom portions, and placing the third layer 30 in at least partial communication with the second layer top surface portion or with the second layer bottom surface portion; the third layer 30 has a third layer length and third layer width less than that of the first pocket; including causing the energy activated flowable polymer to bond to the third layer 30 and at least partially flow into a third gap between the third layer side surface portion and the internal side frame surface creating the bead that is coextensive with that of step g as described above; the third layer 30 has a third layer length and third layer width greater than that of the first pocket; a first pocket length and a first pocket width of the first frame pocket is no greater than about 10 mm, more preferably no greater than about 6 mm and most preferably no greater than about 4 mm larger than the first layer length, the first layer width, or both (although preferably greater than about 0.2 mm, more preferably greater that about 0.4 mm); the second layer length, the second layer width, or both is no greater than about 10 mm, more preferably no greater than about 6 mm and most preferably no greater than about 4 mm larger than that of the first layer 10 (although preferably greater than about 0.2 mm, more preferably greater that about 0.4 mm); providing a second frame pocket including a second frame pocket side wall profile; the second frame pocket includes at least one insertable frame section; the internal side frame surface that projects towards the second frame surface from the first frame surface does so through the entire frame thickness; providing a plurality of additional layers forming the multi-layer stack and placing the plurality of additional layers in at least partial communication with an adjacent layer, wherein these steps occur before step g as described above; providing at least one additional frame pocket including a frame pocket side wall profile: each frame pocket includes at least one layer of the multilayer stack; providing a vacuum source and placing the lamination frame along with the multi-layer stack under a vacuum (e.g. to aid the movement of the energy activated flowable polymer); the multilayer stack includes at least a glass layer, a photovoltaic cell assembly layer, or a back sheet layer; the second layer 20 has a second layer length, a second layer width, and a second layer thickness such that it can flow into and fill the first gap between the internal side frame surface and the first layer side surface portion Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes.

The term "consisting essentially of" to describe a combination shall include the elements, ingredients, components or steps identified, and such other elements ingredients, components or steps that do not materially affect the basic and novel characteristics of the combination.

The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

What is claimed is:

1. A multi-layer laminate structure comprising:
    at least four adjoining layers, the layers comprising:
        an environmental shield layer including a top surface portion, a bottom surface portion, and a side surface portion connecting the top and the bottom surface portions and forming a periphery about the environmental shield layer, wherein the environmental shield layer functions as an environmental shield for successive layers;
        a photovoltaic cell layer including a top surface portion, a bottom surface portion, and a side surface portion connecting the top and the bottom portions and forming a periphery about the photovoltaic cell, wherein the photovoltaic cell comprises one or more photovoltaic cells;
        an energy activated flowable polymer layer including a top surface portion, a bottom surface portion and a side surface portion connecting the top and the bottom surface portions; and
        an environmental protection layer including a top surface portion, a bottom surface portion, and a side surface portion connecting the top and the bottom surface portions;
        wherein the energy activated flowable polymer layer at least is partially bonded to a portion of the side surface portion of the environmental shield layer and the photovoltaic cell layer creating a bead of energy activated flowable polymer about at least the periphery of the environmental shield layer and the photovoltaic cell layer, further wherein the bead has an untrimmed outer surface, and
        wherein the energy activated flowable polymer is between the bottom surface portion of the photovoltaic cell layer and the top surface portion of the environmental protection layer or is between the bottom surface portion of the environmental shield layer and the top surface portion of the photovoltaic cell layer.

2. The multi-layer laminate structure according to claim 1, wherein the environmental shield layer comprises a glass plate.

3. The multi-layer laminate structure according to claim 1, wherein the environmental protection layer comprises a back sheet.

4. The multi-layer laminate structure according to claim 3, wherein at least a portion of the back sheet includes a second energy activated flowable polymer.

5. The multi-layer laminate structure according to claim 1, wherein the photovoltaic cell assembly comprises at least a cell portion and the cell portion is at least 5 mm from an exterior edge of the multi-layer laminate structure.

6. The multi-layer laminate structure according to claim 1, wherein the structure includes five or more layers.

7. The multi-layer laminate according to claim 6 wherein the fifth layer is a bonding layer disposed between the bottom surface portion of the photovoltaic cell layer and the top surface portion of the environmental protection layer or is between the bottom surface portion of the environmental shield layer and the top surface portion of the photovoltaic cell layer.

8. The multi-layer laminate according to claim 6 wherein the structure includes a sixth layer comprising a supplemental barrier layer.

9. The multi-layer laminate according to claim 1 wherein the layer that functions as an environmental shield layer is constructed of transparent or translucent material that allows light energy to pass through to at least one underlying layer.

* * * * *